United States Patent
Abe et al.

(10) Patent No.: US 8,255,214 B2
(45) Date of Patent: *Aug. 28, 2012

(54) SIGNAL PROCESSING METHOD AND PROCESSOR

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 681 days.

This patent is subject to a terminal disclaimer.

(21) Appl. No.: 10/451,317

(22) PCT Filed: Oct. 15, 2002

(86) PCT No.: PCT/JP02/10668
§ 371 (c)(1),
(2), (4) Date: Jun. 19, 2003

(87) PCT Pub. No.: WO03/036510
PCT Pub. Date: May 1, 2003

(65) Prior Publication Data
US 2004/0078196 A1    Apr. 22, 2004

(30) Foreign Application Priority Data
Oct. 22, 2001 (JP) .............................. P2001-324256

(51) Int. Cl.
*G10L 15/00* (2006.01)
(52) U.S. Cl. ........ 704/231; 704/217; 704/219; 704/223; 704/239; 704/240
(58) Field of Classification Search .................. 704/239, 704/240, 223, 216, 217, 219
See application file for complete search history.

(56) References Cited

U.S. PATENT DOCUMENTS

| 4,837,618 | A |   | 6/1989  | Hatori et al.              |
|-----------|---|---|---------|----------------------------|
| 5,806,024 | A | * | 9/1998  | Ozawa ............... 704/222 |
| 5,845,241 | A |   | 12/1998 | Owechko                    |
| 5,867,593 | A |   | 2/1999  | Fukuda et al.              |
| 5,920,842 | A | * | 7/1999  | Cooper et al. ........ 704/503 |

(Continued)

FOREIGN PATENT DOCUMENTS

EP      0267581 A2    5/1988

(Continued)

OTHER PUBLICATIONS

Hiroyuki Hirayama et al., Zatsuon Shori, first edition, The Society of Instrument and Control Engineers, 1985, pp. 182 to 184.

(Continued)

*Primary Examiner* — Leonard Saint Cyr
(74) *Attorney, Agent, or Firm* — Robert J. Depke; Rockey, Depke & Lyons, LLC

(57) ABSTRACT

A first signal of two signals to be compared for similarity is divided into small areas and one small area is selected for calculating the correlation with a second signal using a correlative method. Then, the quantity of translation, expansion rate and similarity in an area where the similarity, which is the square of the correlation value, reaches its maximum, are found. Values based on the similarity are integrated at a position represented by the quantity of translation and expansion rate. Similar processing is performed with respect to all the small areas, and at a peak where the maximum integral value of the similarity is obtained, its magnitude is compared with a threshold value to evaluate the similarity. The small area voted for that peak can be extracted.

17 Claims, 9 Drawing Sheets

U.S. PATENT DOCUMENTS

| | | | |
|---|---|---|---|
| 6,038,069 A | 3/2000 | Yamaguchi | |
| 6,040,864 A * | 3/2000 | Etoh | 375/240.16 |
| 6,226,606 B1 * | 5/2001 | Acero et al. | 704/218 |
| 6,330,428 B1 * | 12/2001 | Lewis et al. | 455/67.11 |
| 6,381,373 B1 * | 4/2002 | Suzuki et al. | 382/263 |
| 6,418,166 B1 * | 7/2002 | Wu et al. | 375/240.12 |
| 6,438,165 B2 * | 8/2002 | Normile | 375/240 |
| 6,477,260 B1 * | 11/2002 | Shimomura | 382/106 |
| 6,628,833 B1 | 9/2003 | Horie | |
| 6,661,918 B1 | 12/2003 | Gordon et al. | |
| 6,859,552 B2 | 2/2005 | Izume et al. | |
| 6,907,367 B2 * | 6/2005 | Baggenstoss | 702/77 |
| 6,937,766 B1 * | 8/2005 | Wilf et al. | 382/229 |
| 6,967,599 B2 * | 11/2005 | Choi et al. | 341/61 |
| 7,010,160 B1 | 3/2006 | Yoshida | |
| 7,031,501 B2 | 4/2006 | Adachi et al. | |

FOREIGN PATENT DOCUMENTS

| | | |
|---|---|---|
| EP | 0 869 445 | 10/1998 |
| EP | 0 973 336 | 1/2000 |
| JP | 63-121372 A | 5/1988 |
| JP | 02-312383 A | 12/1990 |
| JP | 08-079760 | 3/1996 |
| JP | 08-079760 A | 3/1996 |
| JP | 10-336593 | 12/1998 |
| JP | 11-328311 | 11/1999 |
| JP | 2000-078589 | 3/2000 |
| JP | 2000-312343 | 11/2000 |
| JP | 2001-228900 A | 8/2001 |

OTHER PUBLICATIONS

E. Wold et al., "Content-Based Classification, Search, and Retrieval of Audio," IEEE Multimedia, 1996, pp. 27 to 36.

Mototsugu Abe et al., "A Computational Model for Auditory Scene Analysis: Segregation of Multiple Tone Sequences With Individual Rhythms," Japanese Society of Artificial Intelligence.

The Transaction of the Institute of Electronics, Information and Communication Engineers D-11, Oct. 1, 2001, vol. J84-D-11, No. 10, pp. 2270-2279.

Baghai-Ravary, Beet, and Tokhi "The two-dimensional discrete cosine transform applied to speechdata", Acoustics, Speech, and Signal Processing, 1996. ICASSP-96. Conference Proceedings., 1996 IEEE International Conference, Mar. 1996.

* cited by examiner

SIGNAL PROCESSING METHOD AND PROCESSOR

This application claims priority to International Application No. PCT/JP02/10668, filed Oct. 15, 2002 and Japanese Patent Application Number JP2001-324256, filed Oct. 22, 2001, each of which are incorporated herein by reference.

TECHNICAL FIELD

This invention relates to a signal processing method and device, a signal processing program, and a recording medium having a signal processing program recorded thereon, and particularly to a signal processing method and device, a signal processing program, and a recording medium having a signal processing program recorded thereon for evaluating the similarity between plural signals or between different sections of one signal.

BACKGROUND ART

Conventionally, a correlative method is used as a technique for evaluating the similarity of two signals. The correlative method is also referred to as matched filter.

In this correlative method, correlation of two signals is taken while the time between the two signals is shifted, and the similarity can be evaluated by a correlation value at the time when the maximum correlation is taken. The correlative method is an optimum comparison technique because it provides the maximum signal-to-noise ratio between one signal and the other signal. Particularly when a pattern to be detected is known, the correlative method is used as a method for detecting pattern from an observation signal tainted by noise in a wide variety of fields such as signal detection, acoustic processing, image processing, and radar technology.

Meanwhile, in the case of evaluating the similarity between two observation signals from an unknown original signal, or when signals and noise are unsteady, the correlative method might be dominated by unsteadiness of noise components and cannot necessarily be an appropriate comparison technique. Such a case will now be described in detail.

FIGS. 1A and 1B show two observation signals A and B including similar signals. The similar signals included in the observation signals have a shift of 300 samples and a difference in amplitude of approximately 1.5 times. The individual observation signals are tainted by unsteady noise signals. In sections indicated by arrows in FIGS. 1A and 1B, a high signal-to-noise ratio is observed and the two signals are relatively similar to each other. However, in the other parts, there are many noise signals and the two signals are hardly similar to each other. As a matter of course, which section has a high signal-to-noise ratio, that is, which section is suitable for similarity evaluation, is not known in advance.

Of such observation signals, a part consisting of samples 0 to 500 the observation signal A is used as a template and its correlation value with the observation signal B is calculated by the correlative method. The result is shown in FIG. 1C. As indicated by an arrow in FIG. 1C, a peak of correlation is observed near a point where the quantity of translation is 300 samples. However, this peak is not significantly larger than the other peaks and its absolute value is approximately 0.3, which is not high enough. In this manner, with the correlative method, the similarity between observation signals with unsteady signals and noise as described above cannot be evaluated properly.

DISCLOSURE OF THE INVENTION

In view of the foregoing status of the art, it is an object of the present invention to provide a signal processing method and device, a signal processing program, and a recording medium having a signal processing program recorded therein that enable automatic elimination of a section where a noise component is dominant, extraction of sections with high similarity, and evaluation of the similarity using such sections, even in the case of evaluating the similarity between two observation signals from an unknown original signal or when signals and noise are unsteady.

In order to achieve the above-described object, a signal processing method according to the present invention includes: a division step of inputting plural signals and dividing at least one of the plural signals into plural small areas; a parameter extraction step of extracting a conversion parameter used for converting the small areas to acquire similarity with the other signal; a totaling step of totaling values indicating the degree of similarity found on the basis of the conversion parameter; and a similarity evaluation step of evaluating the similarity between the plural signals on the basis of the result of the totaling.

The signal processing method may further include a similar section extraction step of extracting a similar section of the plural signals.

In the signal precessing method, the conversion parameter may be found using a correlative method. In this case, the conversion parameter is, for example, an expansion rate and/or magnitude of a shift at a point where a maximum correlation value between the small area and the other signal is obtained, and at the totaling step, values indicating the degree of similarity between the plural signals are totaled in a space centering the conversion parameter as an axis.

In such a signal processing method, at least one of plural inputted signals is divided into plural small areas and the similarity between each small area and the other signal is found. As these similarity values are totaled, the similarity between the plural signals is evaluated. On the basis of the similarity, a similar section of the plural signals is extracted.

Moreover, in order to achieve the above-described object, a signal processing method according to the present invention includes: a division step of inputting plural signals and dividing at least one of the plural signals into plural small areas; a parameter extraction step of extracting a conversion parameter used for converting the small areas to acquire similarity with the other signal; a totaling step of totaling values indicating the degree of similarity found on the basis of the conversion parameter; a similarity evaluation step of evaluating the similarity between the plural signals on the basis of the result of the totaling; a similar section extraction step of extracting a similar section of the plural signals; a first coding step of coding the similar section of the plural signals extracted at the similar section extraction step; and a second coding step of coding the sections other than the similar section.

The conversion is, for example, expansion and/or shift conversion. In this case, at the first coding step, information of start time of the similar section, expansion rate, and length of the similar section is coded.

In such a signal processing method, at least one of plural inputted signals is divided into plural small areas and the similarity between each small area and the other signal is found. As these similarity values are totaled, the similarity between the plural signals is evaluated. On the basis of the similarity, a similar section of the plural signals is extracted, and the similar section and the other sections are separately coded.

Moreover, in order to achieve the above-described object, a signal processing device according to the present invention includes: division means for inputting plural signals and dividing at least one of the plural signals into plural small areas; parameter extraction means for extracting a conversion parameter used for converting the small areas to acquire similarity with the other signal; totaling means for totaling values indicating the degree of similarity found on the basis of the conversion parameter; and similarity evaluation means for evaluating the similarity between the plural signals on the basis of the result of the totaling.

The signal processing device may further include similar section extraction means for extracting a similar section of the plural signals.

In the signal processing device, the conversion parameter may be found using a correlative method. In this case, the conversion parameter is, for example, an expansion rate and/or magnitude of a shift at a point where a maximum correlation value between the small area and the other signal is obtained, and the totaling means totals values indicating the degree of similarity between the plural signals in a space centering the conversion parameter as an axis.

In such a signal processing device, at least one of plural inputted signals is divided into plural small areas and the similarity between each small area and the other signal is found. As these similarity values are totaled, the similarity between the plural signals is evaluated. On the basis of the similarity, a similar section of the plural signals is extracted.

Moreover, in order to achieve the above-described object, a signal processing device according to the present invention includes: division means for inputting plural signals and dividing at least one of the plural signals into plural small areas; parameter extraction means for extracting a conversion parameter used for converting the small areas to acquire similarity with the other signal; totaling means for totaling values indicating the degree of similarity found on the basis of the conversion parameter; similarity evaluation means for evaluating the similarity between the plural signals on the basis of the result of the totaling; similar section extraction means for extracting a similar section of the plural signals; first coding means for coding the similar section of the plural signals extracted by the similar section extraction means; and second coding means for coding the sections other than the similar section.

The conversion is, for example, expansion and/or shift conversion. In this case, the first coding means codes information of start time of the similar section, expansion rate, and length of the similar section.

In such a signal processing device, at least one of plural inputted signals is divided into plural small areas and the similarity between each small area and the other signal is found. As these similarity values are totaled, the similarity between the plural signals is evaluated. On the basis of the similarity, a similar section of the plural signals is extracted, and the similar section and the other sections are separately coded.

Moreover, in order to achieve the above-described object, a signal processing program according to the present invention includes: a division step of inputting plural signals and dividing at least one of the plural signals into plural small areas; a parameter extraction step of extracting a conversion parameter used for converting the small areas to acquire similarity with the other signal; a totaling step of totaling values indicating the degree of similarity found on the basis of the conversion parameter; and a similarity evaluation step of evaluating the similarity between the plural signals on the basis of the result of the totaling.

The signal processing program may further include a similar section extraction step of extracting a similar section of the plural signals.

In the signal processing program, the conversion parameter may be found using a correlative method. In this case, the conversion parameter is, for example, an expansion rate and/or magnitude of a shift at a point where a maximum correlation value between the small area and the other signal is obtained, and at the totaling step, values indicating the degree of similarity between the plural signals are totaled in a space centering the conversion parameter as an axis.

In such a signal processing program, at least one of plural inputted signals is divided into plural small areas and the similarity between each small area and the other signal is found. As these similarity values are totaled, the similarity between the plural signals is evaluated. On the basis of the similarity, a similar section of the plural signals is extracted.

Moreover, in order to achieve the above-described object, a signal processing program according to the present invention includes: a division step of inputting plural signals and dividing at least one of the plural signals into plural small areas; a parameter extraction step of extracting a conversion parameter used for converting the small areas to acquire similarity with the other signal; a totaling step of totaling values indicating the degree of similarity found on the basis of the conversion parameter; a similarity evaluation step of evaluating the similarity between the plural signals on the basis of the result of the totaling; a similar section extraction step of extracting a similar section of the plural signals; a first coding step of coding the similar section of the plural signals extracted at the similar section extraction step; and a second coding step of coding the sections other than the similar section.

The conversion is, for example, expansion and/or shift conversion. In this case, at the first coding step, information of start time of the similar section, expansion rate, and length of the similar section is coded.

In such a signal processing program, at least one of plural inputted signals is divided into plural small areas and the similarity between each small area and the other signal is found. As these similarity values are totaled, the similarity between the plural signals is evaluated. On the basis of the similarity, a similar section of the plural signals is extracted, and the similar section and the other sections are separately coded.

Moreover, in order to achieve the above-described object, a recording medium according to the present invention is a computer-controllable recording medium having a signal processing program recorded thereon, the signal processing program including: a division step of inputting plural signals and dividing at least one of the plural signals into plural small areas; a parameter extraction step of extracting a conversion parameter used for converting the small areas to acquire similarity with the other signal; a totaling step of totaling values indicating the degree of similarity found on the basis of the conversion parameter; and a similarity evaluation step of evaluating the similarity between the plural signals on the basis of the result of the totaling.

The signal processing program may further include a similar section extraction step of extracting a similar section of the plural signals.

In the signal precessing program, the conversion parameter may be found using a correlative method. In this case, the conversion parameter is, for example, an expansion rate and/or magnitude of a shift at a point where a maximum correlation value between the small area and the other signal is obtained, and at the totaling step, values indicating the degree of similarity between the plural signals are totaled in a space centering the conversion parameter as an axis.

In the signal processing program recorded on such a recording medium, at least one of plural inputted signals is divided into plural small areas and the similarity between each small area and the other signal is found. As these similarity values are totaled, the similarity between the plural signals is evaluated. On the basis of the similarity, a similar section of the plural signals is extracted.

Moreover, in order to achieve the above-described object, a recording medium according to the present invention is a computer-controllable recording medium having a signal processing program recorded thereon, the signal processing program including: a division step of inputting plural signals and dividing at least one of the plural signals into plural small areas; a parameter extraction step of extracting a conversion parameter used for converting the small areas to acquire similarity with the other signal; a totaling step of totaling values indicating the degree of similarity found on the basis of the conversion parameter; a similarity evaluation step of evaluating the similarity between the plural signals on the basis of the result of the totaling; a similar section extraction step of extracting a similar section of the plural signals; a first coding step of coding the similar section of the plural signals extracted at the similar section extraction step; and a second coding step of coding the sections other than the similar section.

The conversion is, for example, expansion and/or shift conversion. In this case, at the first coding step, information of start time of the similar section, expansion rate, and length of the similar section is coded.

In the signal processing program recorded on such a recording medium, at least one of plural inputted signals is divided into plural small areas and the similarity between each small area and the other signal is found. As these similarity values are totaled, the similarity between the plural signals is evaluated. On the basis of the similarity, a similar section of the plural signals is extracted, and the similar section and the other sections are separately coded.

The other objects of the present invention and specific advantages provided by the present invention will be further clarified by the following description of an embodiment.

BRIEF DESCRIPTION OF THE DRAWINGS

FIG. 1A shows the waveform of an observation signal A. FIG. 1B shows the waveform of an observation signal B. FIG. 1C shows the correlation between the observation signal A and the observation signal B found by the correlative method.

FIG. 2A shows division of a signal f(x) into small areas. FIG. 2B shows the state where a similar area is detected in a signal g(x). FIG. 2C shows voting of a parameter of the area into a voting space.

BEST MODE FOR CARRYING OUT THE INVENTION

A specific embodiment to which the present invention is applied will now be described in detail with reference to the drawings. In this embodiment, the present invention is applied to a signal processing device for evaluating the similarity in the case where the same signal component or a similar signal component is included in plural signals or in different sections of one signal and extracting the similar section. Before explaining this signal processing device, the principle of a similarity evaluation technique in this embodiment will be described first.

First, if f(x) and g(x) represent two signals to be compared, p represents a conversion parameter, $H_p[\cdot]$ represents a predetermined conversion group, and n(x) represents a noise component, the two signals can be expressed by the relation of the following equation (1).

$$g(x) = H_p[f(x)] + n(x) \quad (1)$$

If the result of applying the predetermined conversion $H_p[\cdot]$ to the signal f(x) is similar to the signal g(x), the noise component n(x) is a function with a small value. If the result is not similar to the signal g(x) at all, the noise component n(x) is a function with a large value. That is, as the expression of equation (1) is employed, it can be understood that high similarity between the signal f(x) and the signal g(x) means that the noise component n(x) is significantly small with respect to the signal g(x) for a given conversion parameter p. Considering expansion and translation as the most typical exemplary conversion, the two signals can be expressed by the relation of the following equation (2). In equation (2), a represents the expansion rate and y represents the quantity of translation.

$$g(x) = af(x-y) + n(x) \quad (2)$$

When the two signals are expressed by the relation of equation (2), high similarity between the signal f(x) and the signal g(x) means that an expansion rate a and a quantity of translation y which realize a significantly small noise component n(x) exist.

As is known well, the expansion rate a and the quantity of translation y which minimizes the energy of the noise component n(x) with respect to the energy of the signal g(x) can be found by the correlative method.

However, if the noise component n(x) is unsteady and it is partially weak and partially strong, that is, when the signal g(x) satisfies the following equation (3), the expansion rate a and the quantity of translation y cannot necessarily be found properly by the correlative method that uniformly optimizes the whole signal, as described above.

$$g(x) \approx \begin{cases} af(x-y) & \text{(a certain section)} \\ n(x) & \text{(other sections)} \end{cases} \quad (3)$$

Thus, in this embodiment, local similarity is found and its respective values are integrated to evaluate the similarity as a whole.

Figure 2A:
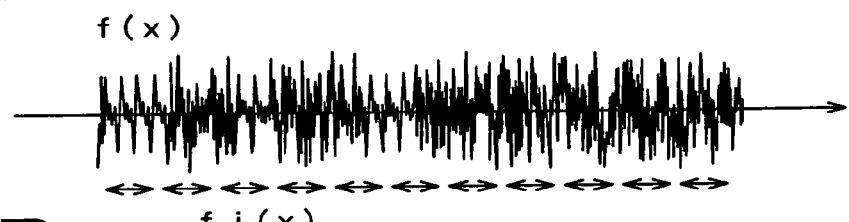
FIGS. 2A to 2C are views for explaining the principle of a signal processing method of this embodiment.

In the technique of this embodiment, first, the signal f(x) is divided into I units of small sectional signals $f_i(x)$ in accordance with the following equation (4), as shown in FIG. 2A. In equation (4), $x_i$ represents the end point of each section and i (=0, 1, . . . , I-1) indicates the index of each section. Of course, the number of divisions is not limited to that shown in FIG. 2A and can be arbitrarily set. Although the signal is divided so that the individual sections do not overlap each other in FIG. 2A, the sections may overlap each other.

$$f_i(x) = \begin{cases} f(x) & (x_i \le x < x_{i+1}) \\ 0 & \text{(others)} \end{cases} \quad (4)$$

Next, with respect to each sectional signal $f_i(x)$ and the signal g(x), the expansion rate $a=a_i$ and the quantity of translation $y=y_i$ that minimize the noise energy J(a, y) for the signal energy, and the similarity $s_i$ at that time, are found as in the following equation (5). The expansion rate a is a multiplication coefficient which realizes a pattern of the sectional signal $f_i(x)$ that is most coincident with the pattern of the signal g(x).

$$J(a, y) = \frac{\int_{x_i}^{x_{i+1}} n^2(x+y)dx}{\int_{x_i}^{x_{i+1}} g^2(x+y)dx} \quad (5)$$

This leads to a secondary minimization problem and the quantity of translation $y_i$ and the expansion rate $a_i$ can be found, as expressed by the following equations (6) and (7).

$$y_i = \underset{y}{\mathrm{argmax}} \left[ \frac{\left\{\int_{x_i}^{x_{i+1}} f_i(x)g(x+y)dx\right\}^2}{\int_{x_i}^{x_{i+1}} f_i^2(x)dx \int_{x_i}^{x_{i+1}} g^2(x+y)dx} \right] \quad (6)$$

$$a_i = \frac{\int_{xi}^{x_{i+1}} f_i(x)g(x+y_i)dx}{\int_{xi}^{x_{i+1}} f_i^2(x)dx} \quad (7)$$

Figure 2B:
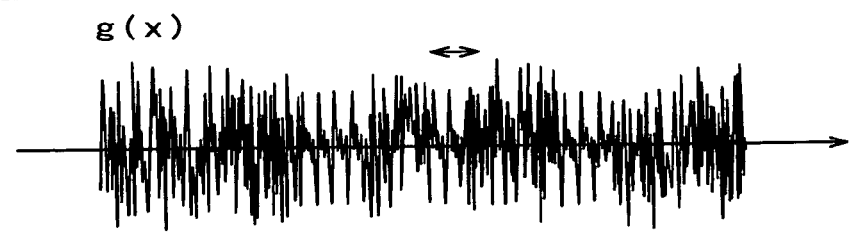

Equation (6) means that the quantity of translation $y_i$ is found as the shift quantity that maximizes the correlation (the square of the correlation) between the sectional signal $f_i(x)$ and the signal g(x). Equation (7) indicates that $a_i$ is found as the expansion rate that minimizes the noise energy at that time. For example, as a section of the signal g(x) that maximizes the correlation (the square of the correlation) between the sectional signal $f_i(x)$ and the signal g(x), a section indicated by an arrow in FIG. 2B is found.

In this case, the similarity $s_i$ between the sectional signal $f_i(x)$ and the signal g(x) is found as the square of the maximum correlation value, as expressed by the following equation (8).

$$s_i = 1 - J(a, y) = \frac{\left\{\int_{x_i}^{x_{i+1}} f_i(x)g(x+y_i)dx\right\}^2}{\int_{x_i}^{x_{i+1}} f_i^2(x)dx \int_{x_i}^{x_{i+1}} g^2(x+y_i)dx} \quad (8)$$

Figure 2C:
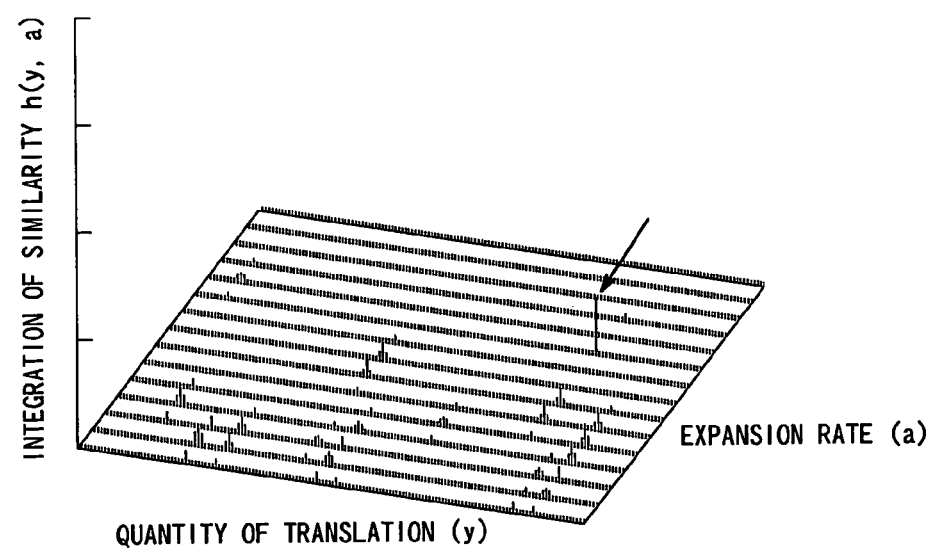

Subsequently, after the quantity of translation $y_i$, the expansion rate $a_i$ and the similarity $s_i$ are found for all the sections i, the similarities of the respective sections are integrated by a voting method. The voting method is such a method that in a characteristic space h(y,a) where the quantity of translation y and the expansion rate a are partitioned into appropriate cells, the similarity $s_i$ is integrated to the cell to which the quantity of translation $y_i$ and the expansion rate $a_i$ correspond and the respective similarities are totaled as shown in FIG. 2C, as expressed by the following equation (9). It is equivalent to a kind of histogram preparation. In equation (9), $\delta(y,a)$ is Kronecker's $\delta$, which expresses a function equal to 1 for $y \approx y_i$, $a \approx a_i$, and 0 otherwise. The entire right side is divided by I in order to standardize the integral value at [0,1], independent of the total number of votes, that is, the number of divided small areas.

$$h(y, a) = \frac{1}{I} \sum_{i=0}^{J-1} s_i \delta(y - y_i, a - a_i) \quad (9)$$

In this case, the quantity of translation $y_i$ and the expansion rate $a_i$ acquired from a section with high similarity are common quantity translation $y_i$ and expansion rate $a_i$, and the similarity $s_i$ acquired from the section with high similarity has a relatively large value, as indicated by the above-described equation (3). Therefore, a large peak is formed at a predetermined point by the voting operation.

On the other hand, the quantity of translation $y_i$ and the expansion rate $a_i$ acquired from a section with low similarity are accidental and unsteady, and the similarity $s_i$ acquired from the section with low similarity has a relatively small value. Therefore, a large peak is not formed because of the dispersion by the voting operation.

Figure 1A:
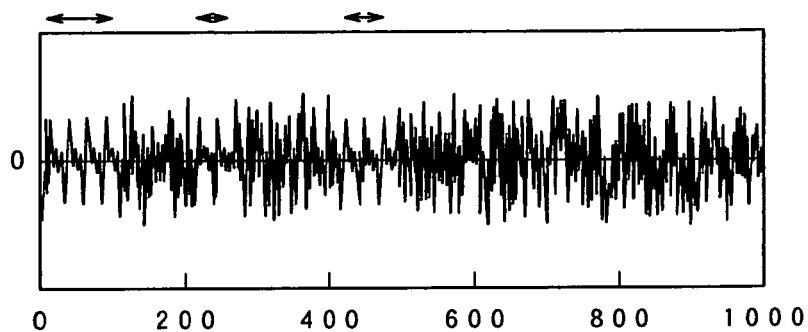
FIGS. 1A to 1C are views for explaining exemplary signals such that it is difficult to detect similarity by a conventional correlative method.
Figure 1B:
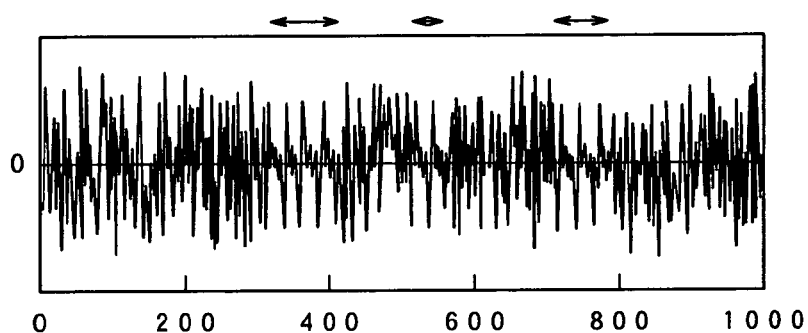
Figure 1C:
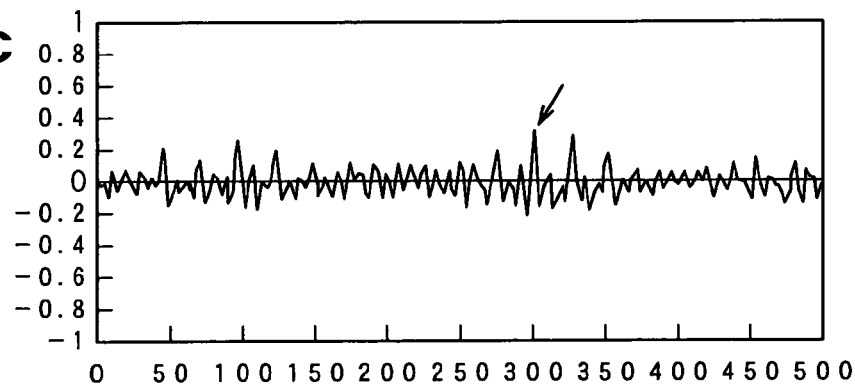
Figure 3:
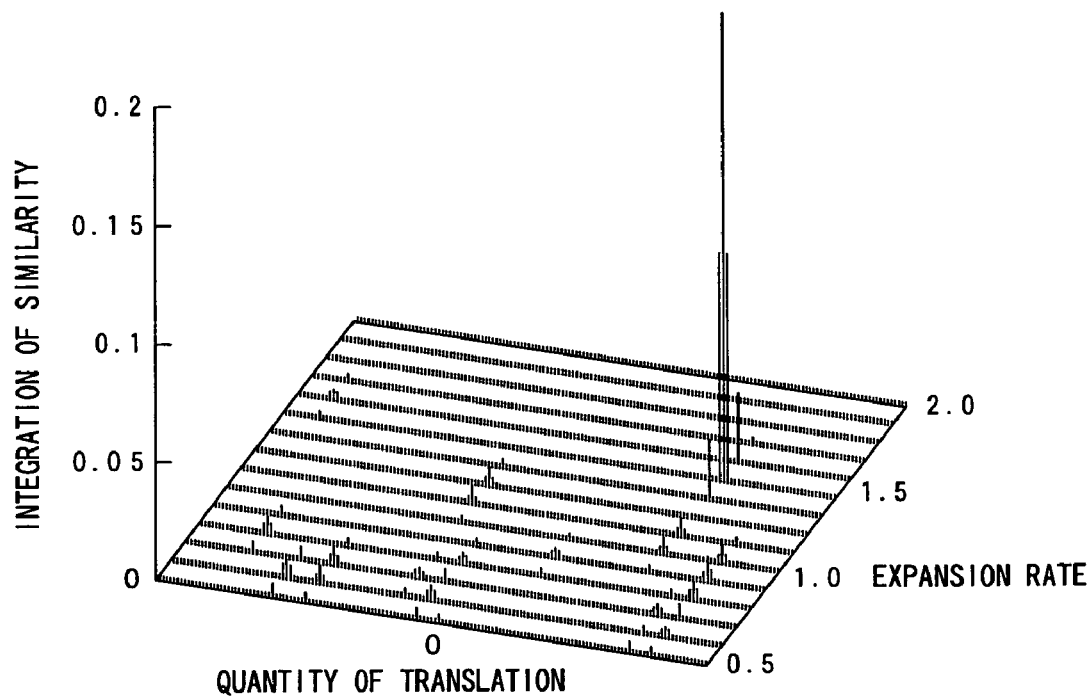
FIG. 3 is a view for explaining the principle of the signal processing method and showing the state where a peak is formed near a point with a predetermined quantity of translation and expansion rate.

FIG. 3 shows the result of voting in which this technique is applied to the signals of FIGS. 1A and 1B. As can be seen from FIG. 3, a large peak is formed at a point where the quantity of translation is 300 samples and the expansion rate is 1.5, but no large peaks are formed in the other parts.

After voting is done for all i (=0, 1, . . . I-1), the maximum peak position is represented by ($y_m$, $a_m$) and the integral value of the similarity $s_i$ in this case is represented by $s_m$, as expressed by the following equations (10) and (11).

$$(y_m, a_m) = \underset{y,a}{\mathrm{argmax}} \, h(y, a) \quad (10)$$

$$s_m = \max_{y,a} h(y, a) = h(y_m, a_m) \quad (11)$$

If the maximum similarity $s_m$ does not exceed a predetermined threshold value $s_{thsd}$, it is judged that the signals f(x) and g(x) are not similar to each other. On the contrary, if the maximum similarity $s_m$ is equal to or higher than the threshold value $s_{thsd}$, it is judged that the signals are similar to each other or have similar parts. The similarity between the two signals in this case is the maximum similarity $s_m$.

In this manner, in this embodiment, as local similarity is found and the respective values of the local similarity are integrated, the similarity as a whole can be evaluated.

Moreover, by conversely finding a small area that is voted to the cell ($y_m, a_m$), it is possible to find a signal section of f(x) similar to a signal section of g(x). Specifically, for example, the quantity of translation $y_i$ and the expansion rate $a_i$ at the time of finding the similarity $s_i$ for each sectional signal $f_i(x)$ are stored and only the quantity of translation and expansion rate sufficiently close to the quantity of translation $y_m$ and the expansion rate $a_m$ at the peak position are selected, thereby detecting a similar section.

Figure 4:
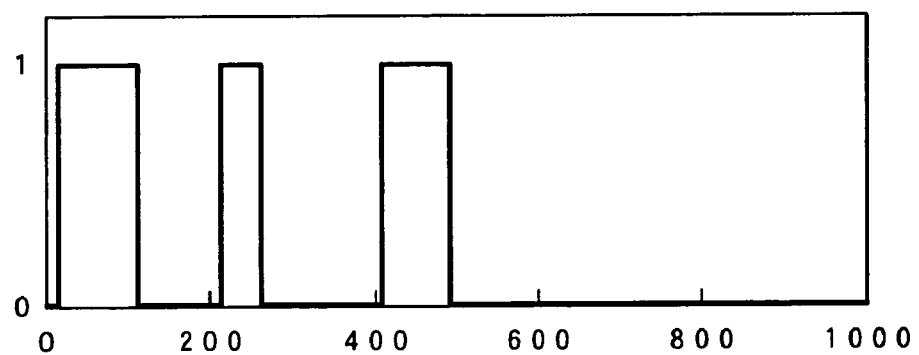
FIG. 4 is a view for explaining the principle of the signal processing method and showing an example in which similar areas are extracted.

FIG. 4 shows similar sections obtained as a result of the above-described calculation. In FIG. 4, a value 1 indicates a section that is judged to be similar and a value 0 indicates a section that is not judged to be similar. Compared with the signal shown in FIG. 1A, the sections indicated by arrows in FIG. 1A have a value 1 and it can be confirmed that the similar sections are detected.

In the above description, the expansion rate $a=a_i$ and the quantity of translation $y=y_i$ that minimize the noise energy J(a,y) with respect to the signal energy are found in equations (5) and (6). However, the present method is not limited to this and all the sections in which the noise energy J(a,y) with respect to the signal energy is equal to or less than a predetermined value may be voted.

In the above description, only the maximum similarity $s_m$ of the similarity at the peak positions found by equations (10) and (11) is compared with the threshold value $s_{thsd}$ and if the threshold value $s_{thsd}$ is exceeded, the small area voted to the peak is conversely found. However, the present method is not limited to this and the small areas voted for all the peaks exceeding the threshold $s_{thsd}$ may be found. Thus, if there are plural sections of the signal g(x) similar to sections of the signal f(x), all these sections can be extracted.

The principle of the similarity evaluation technique of this embodiment is described above. Now, the schematic structure of a signal processing device of this embodiment will be described with reference to FIG. 5. In the following description, the signal processing device 10 is adapted for inputting a first signal and a second signal and evaluating the similarity between these signals. However, the signal processing device may input only one signal and evaluate the similarity between different sections of that signal.

Figure 5:
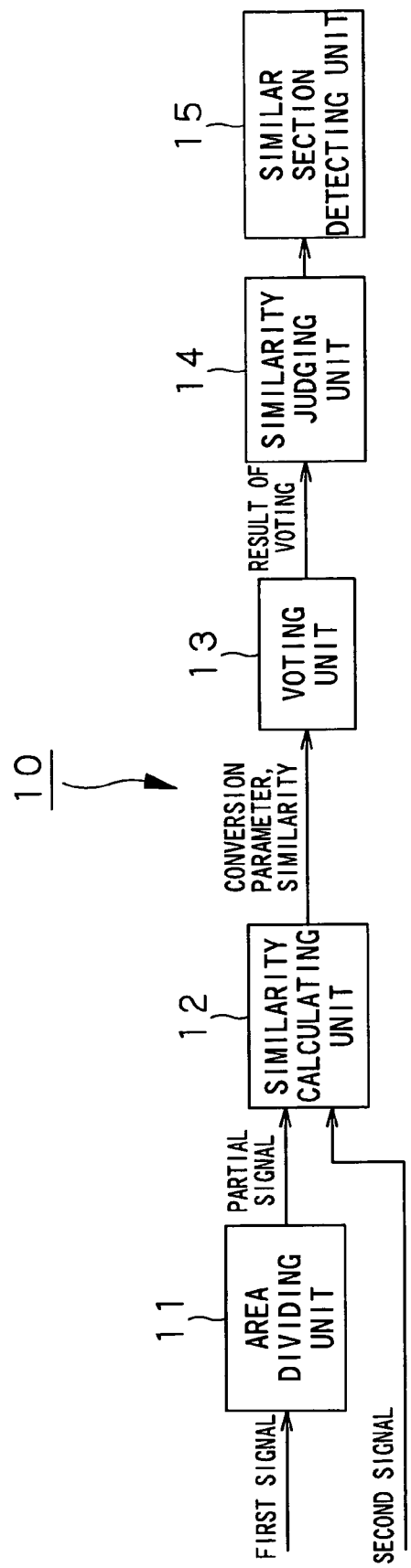
FIG. 5 is a view for explaining the schematic structure of a signal processing device of this embodiment.

As shown in FIG. 5, the signal processing device 10 of this embodiment has an area dividing unit 11, a similarity calculating unit 12, a voting unit 13, a similarity judging unit 14, and a similar section detecting unit 15.

The area dividing unit 11 divides the first signal into small areas. As described above, the number of divisions can be arbitrarily set and small areas may overlap each other.

The similarity calculating unit 12 calculates the correlation between each of the small areas provided by division at the area dividing unit 11 and the second signal. The similarity calculating unit 12 searches for the largest value of the acquired similarities, that is, the squares of correlation values, and acquires the similarity s, time difference t and expansion rate a. The expansion rate a is a multiplication coefficient to realize a size of the pattern of the small area that is most coincident with the pattern of the second signal.

The voting unit 13 votes the acquired similarity s, time difference t and expansion rate a into a voting space. The voting space is a feature space using the time difference t and the expansion rate a as variables for finding an integral value of the similarity s. The similarity s is integrated at a position having the time difference t and the expansion rate a acquired from the small area.

As described above, when the first signal and the second signal include similar signal components, the patterns of the corresponding small areas are similar to each other. Therefore, the similarity s between these small areas is high and their time difference t and expansion rate a are approximately coincident with those of the other small areas.

On the other hand, with respect to a small area corresponding to a part that is not similar, the maximum similarity is acquired at a position that is accidentally most similar. Therefore, the overall similarity s is low and the time difference t and the expansion rate a are independent of those of the other small areas.

Therefore, when a similar signal component exists, voting of plural small areas corresponding to this signal component concentrates at the same position and a significantly large peak is expected to be formed. When no similar component exists, the similarity is essentially low and voting is dispersed at different positions. Therefore, no significant peak is formed.

Thus, after voting for all the small areas is performed, the similarity judging unit 14 searches for the maximum similarity $s_m$ in the voting space and compares the maximum similarity $s_m$ with the threshold value $s_{thsd}$, thereby judging the similarity.

When the similarity judging unit 14 judges that the similarity is high, the similar area detecting unit 15 detects a similar area. The similar area detecting unit 15 detects a similar area, for example, by selecting only a small area where the time difference t and the expansion rate a are sufficiently close to the time difference $t_m$ and the expansion rate $a_m$ of the peak position.

Figure 6:
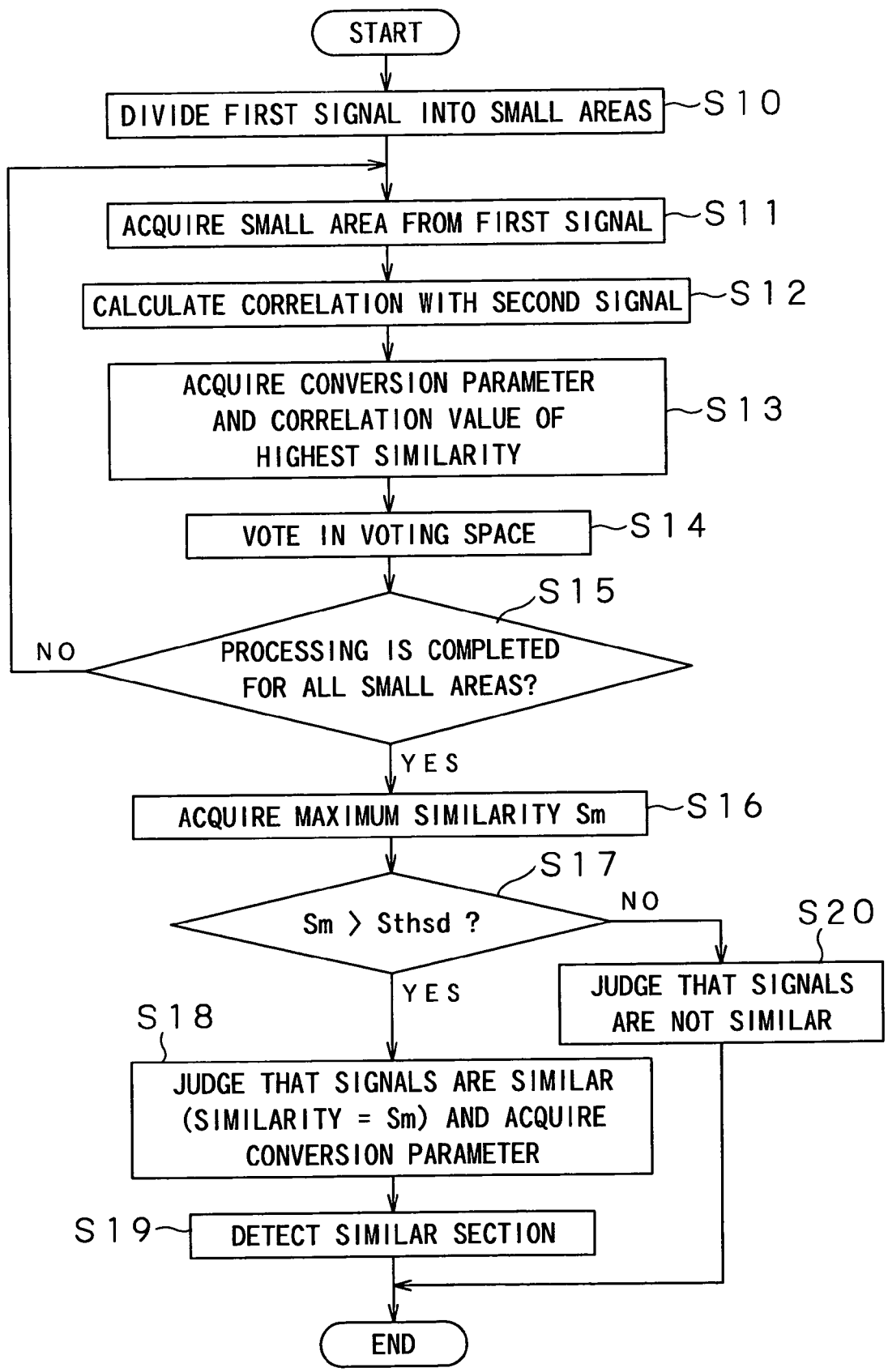
FIG. 6 is a flowchart for explaining the operation of the signal processing device.

The operation of the signal processing device 10 having the above-described structure will now be described with reference to the flowchart of FIG. 6. First at step S10, the first signal is divided into small areas as described above, and at the next step S11, one of the small areas is selected.

At step S12, the correlation between the small area selected at step S11 and the second signal is calculated.

At step S13, the largest value of the similarity obtained at step S12 is found and the similarity s, the time difference t and the expansion rate a are acquired.

At the next step S14, the similarity s, the time difference t and the expansion rate a acquired at step S13 are voted in the voting space. That is, the similarity s is integrated at the position having the time difference t and the expansion rate a acquired from the small area.

At step S15, whether processing is completed for all the small areas or not is judged. If there still is a small area for which processing is not completed at step S15, the processing returns to step S11 and the above-described processing is repeated for the remaining small area. If processing is completed for all the small areas, the processing goes to step S16.

At step S16, the maximum similarity $s_m$ in the voting space is searched for and acquired. At the next step S17, whether the maximum similarity $s_m$ exceeds a predetermined threshold value $s_{thsd}$ or not is judged. If the maximum similarity $s_m$ does not exceed the predetermined threshold value $s_{thsd}$ (NO) at step S17, it is assumed that no significant peak is formed and the processing goes to step S20. Then, it is judged that the first signal and the second signal are not similar to each other, and the processing ends. If the maximum similarity $s_m$ exceeds the predetermined threshold value $s_{thsd}$ (YES) at step S17, it is assumed that a significant peak is formed and the processing goes to step S18.

At step S18, it is judged that the first signal and the second signal are similar to each other, and the time difference $t_m$ and the expansion rate $a_m$ are acquired. The similarity between the first signal and the second signal is assumed to be the maximum similarity $s_m$.

At step S19, similar areas are detected. Specifically, only small areas having the time difference t and the expansion rate a that are sufficiently close to the time difference $t_m$ and the expansion rate $a_m$ of the peak position are selected, and the processing ends.

By carrying out the processing as described above, the signal processing device 10 can appropriately evaluate the similarity between observation signals having unsteady noise and can extract similar parts from the signals.

Figure 7:
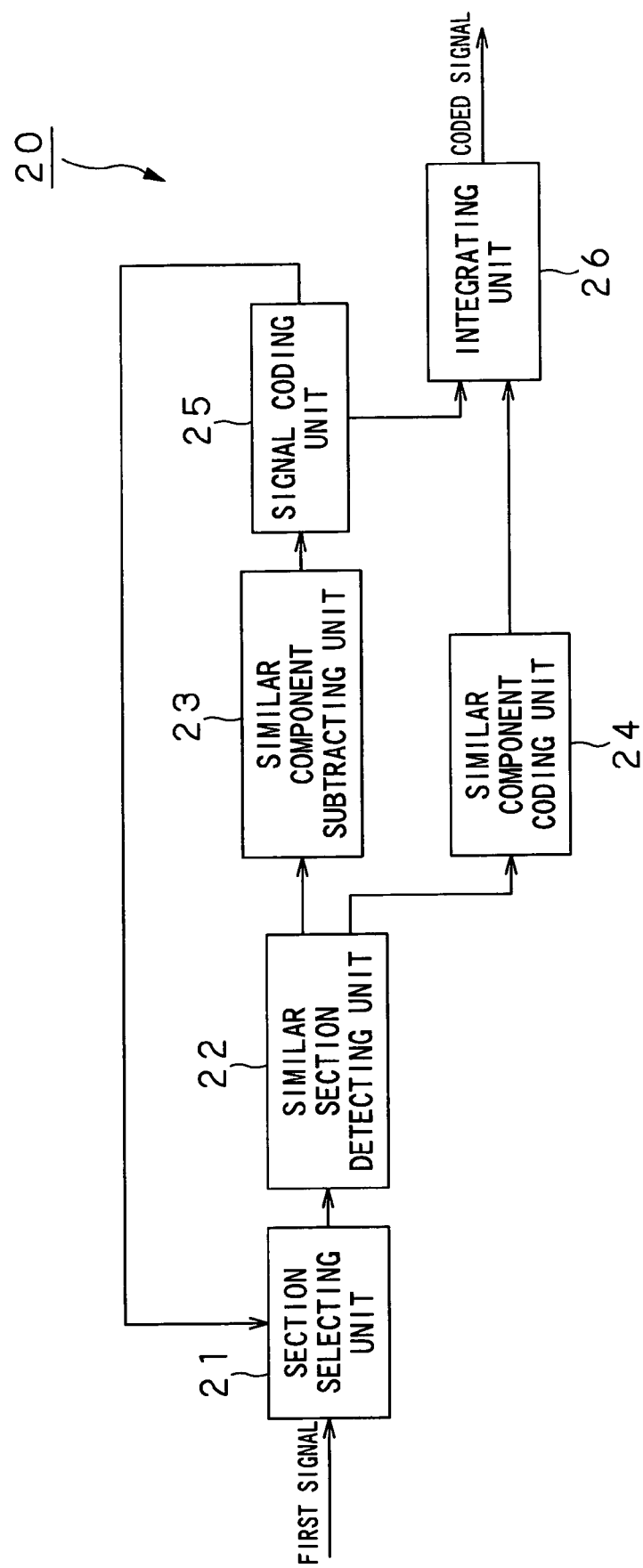
FIG. 7 is a view for explaining the schematic structure of a coding device using the signal processing device.
Figure 8:
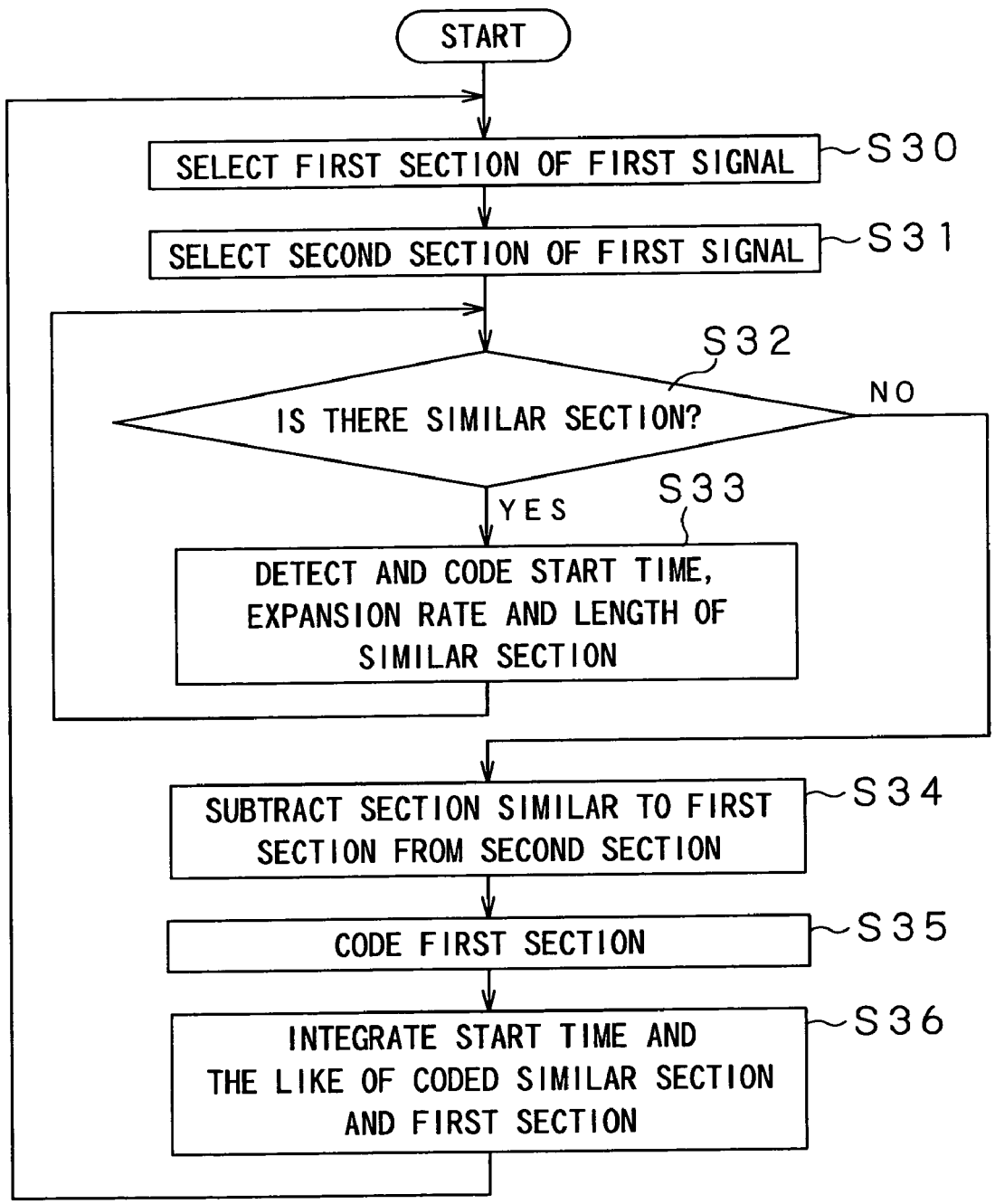
FIG. 8 is a flowchart for explaining the operation of the coding device.

The above-described signal processing device 10 can be used, for example, in a coding device 20 as shown in FIG. 7. This coding device 20 has the above-described signal processing device 10 and detects and separately codes similar waveform parts of a signal in which a similar waveform repeatedly appears, for example, an acoustic signal waveform, thereby improving the coding efficiency (compression efficiency).

As shown in FIG. 7, the coding device 20 has a section selecting unit 21, a similar section detecting unit 22, a similar component subtracting unit 23, a similar component coding unit 24, a signal coding unit 25, and an integrating unit 26. The similar section detecting unit 22 is equivalent to the above-described signal processing device 10.

The operation of the coding device 20 having such a structure will now be described with reference to the flowchart of FIG. 8 and FIGS. 9 to 12.

Figure 9:
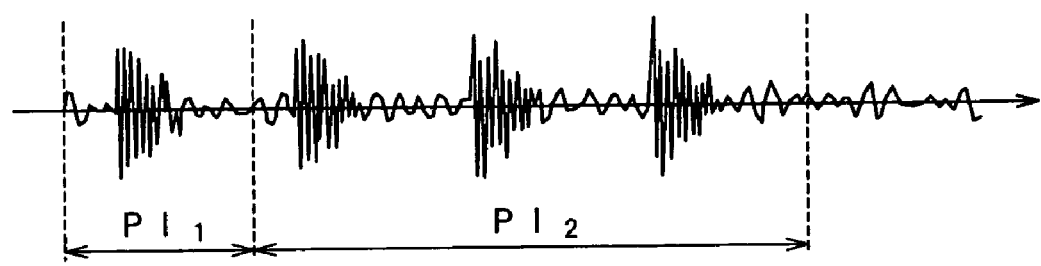
FIG. 9 is a view for explaining selection of a first section and a second section in the coding device.

First at step S30, the section selecting unit 21 selects a first section $PI_1$ with an appropriate length, for example, one second, from the inputted first signal, as shown in FIG. 9. At the next step S31, the section selecting unit 21 selects a second section $PI_2$ that is different from the first section, for example, a section of 10 seconds following the first section $PI_1$.

At the next step S32, the similar section detecting unit 22 detects whether the second section $PI_2$ has a section similar to the first section $PI_1$ or not. If the second has a similar section (YES) at step S32, the processing goes to step S33. If the second section has no similar section, the processing goes to step S34.

Figure 10:
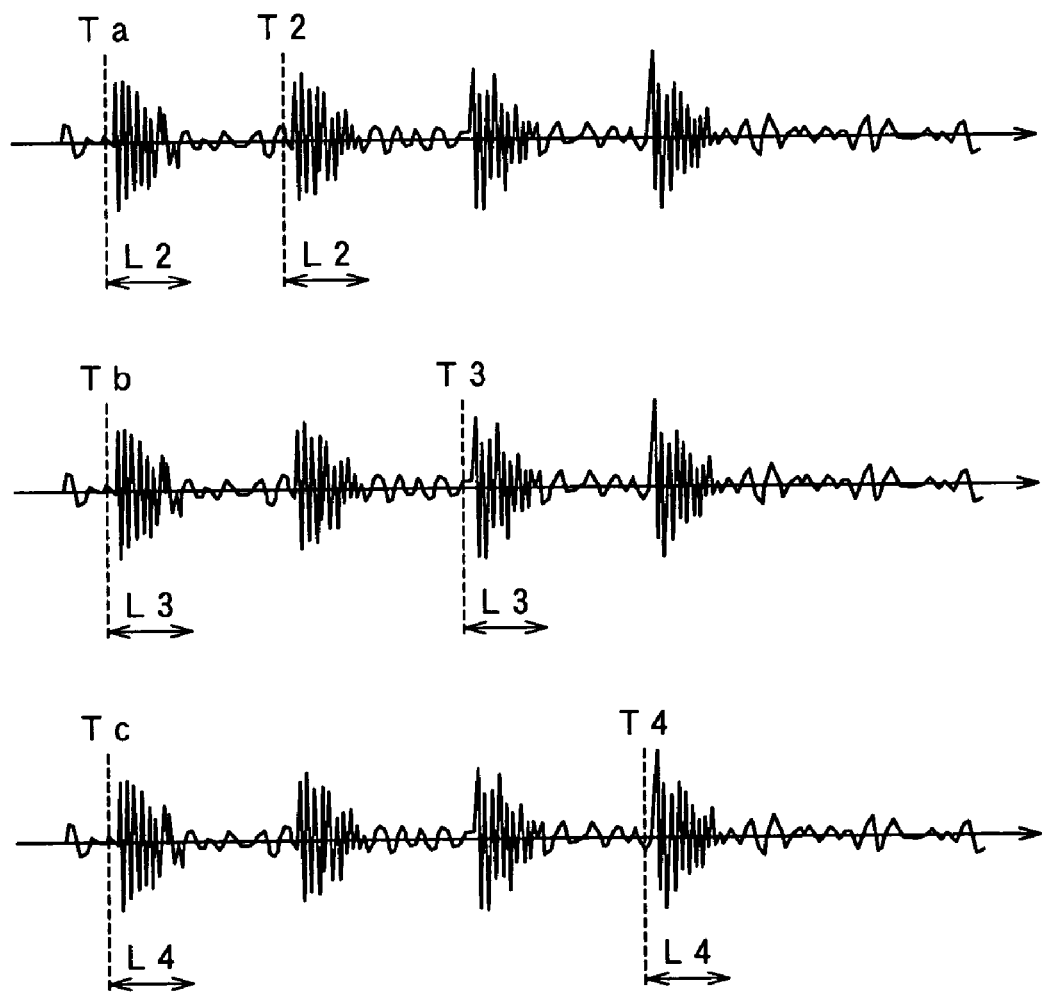
FIG. 10 is a view for explaining extraction of a similar section in the coding device.

At step S33, the similar section detecting unit 22 detects the start time ($T_a$, $T_2$) of the similar section, the expansion rate ($a_2$) and the length ($L_2$) of the similar section, as shown in FIG. 10, and the similar component coding unit 24 codes these. The processing then returns to step S32 and another similar section is detected. FIG. 10 shows an example in which two more parts ($T_b$, $T_3$, $a_3$, $L_3$) and ($T_c$, $T_4$, $a_4$, $L_4$) are detected.

Figure 11:
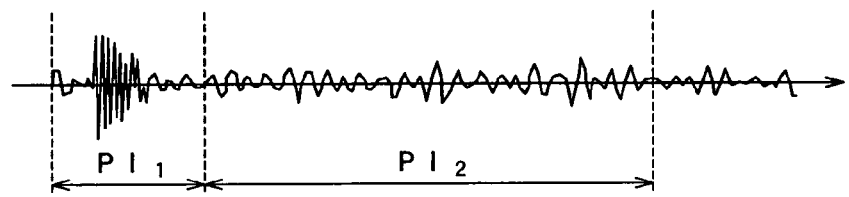
FIG. 11 is a view for explaining coding of the first section in the coding device.

After all the similar sections are detected and coded, at step S34, the similar component subtracting unit 23 subtracts the sections similar to the first section $PI_1$ from the second section $PI_2$, as shown in FIG. 11. In the subtraction, the size is matched using the detected expansion rates. After the subtraction, non-similar components remain in each similar section.

At step S35, the signal coding unit 25 codes the signal of the first section $PI_1$ using a typical signal coding method (for example, subband coding, transform coding or the like).

Figure 12:
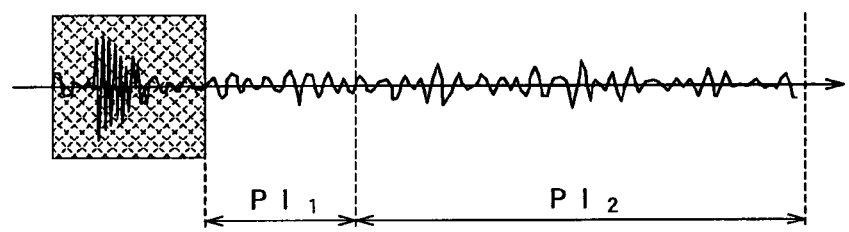
FIG. 12 is a view for explaining another selection of a first section and a second section in the coding device.

At step S36, the integrating unit 26 integrates the information such as the start time coded at step S33 and the signal of the first section $PI_1$ coded at step S35 into one coded signal and outputs the coded signal. Then, a first section $PI_1$ is newly taken as shown in FIG. 12 and the processing is repeated. A shaded part in FIG. 12 indicates a coded part.

Figure 13:
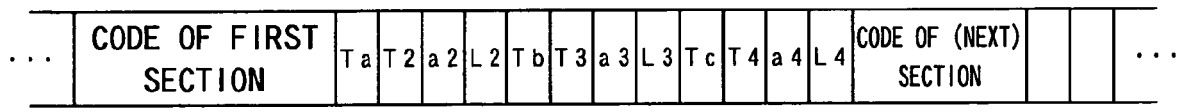
FIG. 13 is a view for explaining an exemplary coded signal integrated in the coding device.

FIG. 13 shows an example of the integrated coded signal. As seen from FIG. 13, for example, the code the signal of the first section $PI_1$ is followed by the codes obtained by coding the start time, expansion rate and length of the sections in the second section $PI_2$ similar to the first section $PI_1$. Next to this, the codes of the next section are arrayed.

With this coding device 20, since the typical coding method is used as it is in the first section, the coding efficiency is the same as that of the typical coding method. However, in the second and subsequent sections, as components similar to the signal of the first section have been subtracted, the quantity of information of the signal is reduced and the coding efficiency can be improved, compared with the case of using the ordinary coding method as it is.

As described above, in the signal processing device of this embodiment, a signal is divided into small areas and the similarity of the respective small areas is found and integrated to evaluate the overall similarity. Therefore, the similarity can be evaluated even with a signal having unsteady noise that cannot be easily detected by a typical correlative method or the like.

Moreover, as this signal processing device is provided in a coding device to detect and separately code similar waveform parts in advance with respect to a signal in which a similar waveform repeatedly appears, the coding efficiency (compression efficiency) can be improved.

The signal processing method of this embodiment can also be applied to detection of similar signals in the entire field of signal processing such as signal detection, acoustic processing, image processing, and radar technology.

The present invention is not limited to the above-described embodiment and various modifications can be made without departing from the scope of the invention.

For example, though the most common techniques of expansive conversion and shift conversion are carried out and the expansion rate and the quantity of translation are used as conversion parameters in the above description, the present invention is not limited to this and can be applied to any conversion including nonlinear conversion.

Moreover, while the technique of minimizing the secondary error energy, which is the most common similarity evaluation quantity, is used, that is, the correlative method is used in the above description, the present invention is not limited to this and can be applied to other types of similarity evaluation quantity.

Industrial Applicability

According to the present invention, a signal is divided into small areas and the similarity of the respective small areas is found and integrated to evaluate the overall similarity. Therefore, the similarity can be evaluated even with a signal having unsteady noise that cannot be easily detected by a typical correlative method or the like. Moreover, as the present invention is used to detect and separately code similar waveform parts in advance with respect to a signal in which a similar waveform repeatedly appears, the coding efficiency (compression efficiency) can be improved.

The invention claimed is:

1. A signal processing method executed by a processor controlled system for comparing a plurality of input signals and determining a level of similarity between the plurality of signals, the method comprising:

dividing at least one of the plurality of signals into plural small areas;

comparing the small areas and integrating a similarity at a plurality of a time difference values and/or expansion values, wherein a conversion parameter that is an expansion rate and/or a magnitude of shift where a maximum correlation is determined and is used for making a similarity determination;

and further determining similarity between the plurality of signals on the basis of an integrated similarity and thereafter identifying at least two of the plurality of input signal as being the same based on the integrated similarity and wherein a voting unit votes on an acquired similarity for a time difference and expansion rate and the similarity is integrated at specific positions in order to determine similarity.

2. The signal processing method as claimed in claim 1, further comprising a similar designating step of designating a previously identified similar section from the plurality of signals as being the same.

3. The signal processing method as claimed in claim 2, wherein at the similar section designating step, the small areas are designated for which a conversion parameter is substantially equal to the conversion parameter of a point where a result of totaling reaches its maximum.

4. The signal processing method as claimed in claim 1, wherein a conversion parameter is found using a correlative method.

5. The signal processing method as claimed in claim 4, wherein the conversion parameter represents an expansion rate and/or magnitude of a shift where a maximum correlation value between the small area and the remainder of the plurality of signals is obtained.

6. The signal processing method as claimed in claim 1, wherein at the integrating step, values indicating a degree of similarity between each of the divided small areas and the remainder of the plurality of signals are totaled in a space centering a conversion parameter as an axis.

7. The signal processing method as claimed in claim 1, wherein the respective values indicating a degree of similarity at the integrating step are values proportional to the similarity between each of the divided small areas and the remainder of the plurality of signals.

8. The signal processing method as claimed in claim 7, wherein a correlation value between each of the divided small areas and the remainder of the plurality of signals or the square of the correlation value is used as the measure of similarity.

9. The signal processing method as claimed in claim 1, wherein the plurality of input signals comprise different portions of a single original signal.

10. A signal processing method executed by a processor controlled system for comparing a plurality of input signals and determining a level of similarity between the plurality of signals, the method comprising:
dividing at least one of the plurality of signals into plural small areas;
comparing the small areas and integrating a similarity at a plurality of time difference values and/or expansion values, and wherein a conversion parameter that is an expansion rate and/or a magnitude of shift where a maximum correlation is determined and is used for making a similarity determination;
and further,
determining similarity between of the plurality of input signals on the basis of the integrated similarity;
a similar section designating step of designating identified similar sections from the plurality of signals and thereafter identifying at least two of the plurality of input signal as being the same based on the integrated similarity and wherein a voting unit votes on an acquired similarity for a time difference and expansion rate and the similarity is integrated at specific positions in order to determine similarity.

11. The signal processing method as claimed in claim 10, wherein a conversion parameter represents an expansion rate and/or magnitude of shift of the conversion, and information including a start time of the similar section, expansion rate, and length of the similar section is coded.

12. A signal processing device for comparing a plurality of input signals and determining a level of similarity between the plurality of signals, the device comprising:
a division means for dividing at least one of the plurality of signals into plural small areas;
means for comparing the small areas by integrating a similarity at a plurality of a time difference values and/or expansion values, and further wherein a conversion parameter that is an expansion rate and/or a magnitude of shift where a maximum correlation is determined is used for making a similarity determination; and
means for automatically identifying similarity between each of the small divided areas and a part of the remainder of the plurality of input signals on the basis of an integrated similarity and thereafter identifying at least two of the plurality of input signal as being the same based on the integrated similarity and wherein a voting unit votes on an acquired similarity for a time difference and expansion rate and the similarity is integrated at specific positions in order to determine similarity.

13. The signal processing device as claimed in claim 12, further comprising similar section designating means for designating a previously identified similar section from the plurality of signals as being the same.

14. The signal processing device as claimed in claim 13, wherein the similar section designating means designates the small areas for which a conversion parameter is substantially equal to the conversion parameter of a point where the result of the integration reaches its maximum.

15. The signal processing device as claimed in claim 12, wherein a conversion parameter is used for an expansion and/or shift conversion operation.

16. The signal processing device as claimed in claim 15, wherein the conversion parameter is found using a correlative method.

17. The signal processing device as claimed in claim 16, wherein the conversion parameter represents an expansion rate and/or magnitude of a shift where a maximum correlation value between the small area and the remainder of the plurality of signals is obtained.

* * * * *